No. 723,101. PATENTED MAR. 17, 1903.
M. WHITESIDE.
DRAFT EQUALIZER.
APPLICATION FILED NOV. 25, 1902.
NO MODEL. 2 SHEETS—SHEET 1.

Witnesses
Inventor
M. Whiteside

Attorneys

No. 723,101. PATENTED MAR. 17, 1903.
M. WHITESIDE.
DRAFT EQUALIZER.
APPLICATION FILED NOV. 25, 1902.
NO MODEL. 2 SHEETS—SHEET 2.

Witnesses

Inventor
M. Whiteside

UNITED STATES PATENT OFFICE.

MADISON WHITESIDE, OF CARRIER, OKLAHOMA TERRITORY.

DRAFT-EQUALIZER.

SPECIFICATION forming part of Letters Patent No. 723,101, dated March 17, 1903.

Application filed November 25, 1902. Serial No. 132,755. (No model.)

*To all whom it may concern:*

Be it known that I, MADISON WHITESIDE, a citizen of the United States, residing at Carrier, in the county of Garfield, Territory of Oklahoma, have invented certain new and useful Improvements in Draft-Equalizers; and I do hereby declare the following to be a full, clear, and exact description of the invention, such as will enable others skilled in the art to which it appertains to make and use the same.

This invention relates to draft-equalizers; and it has for its object to provide a construction which may be applied to vehicles or to farm implements and by reason of which unequal drafts at opposite sides of the tongue of the vehicle or implement will be equalized.

A further object of the invention is to provide a construction which may be readily adjusted to equalize different values, so that the apparatus may be employed under various conditions.

Further objects and advantages of the invention will be understood from the following description.

Figure 1:
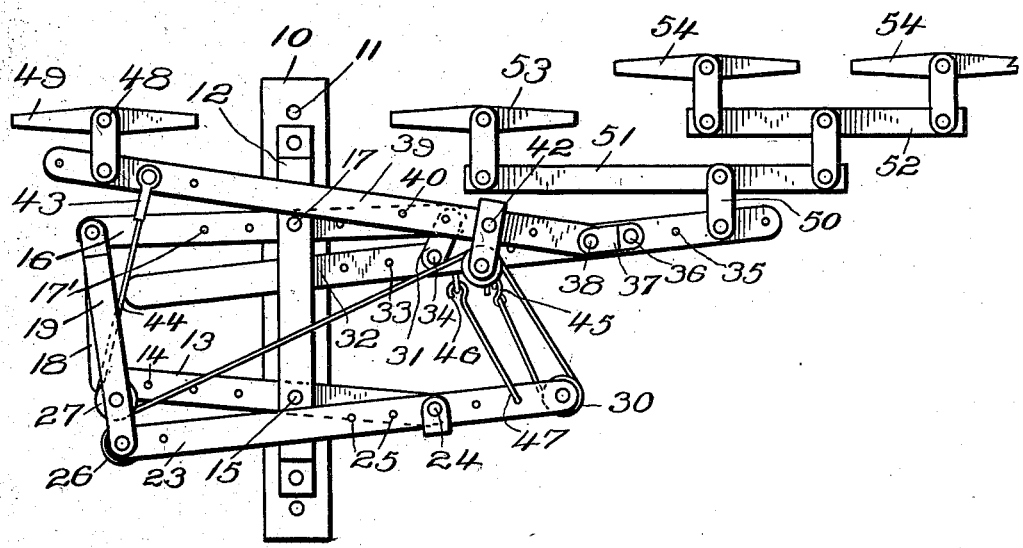
Figure 3:
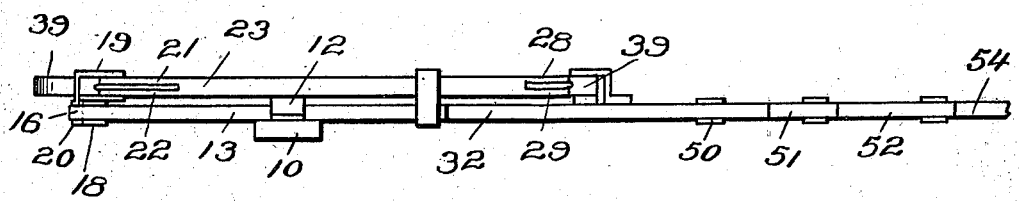
Figure 3:
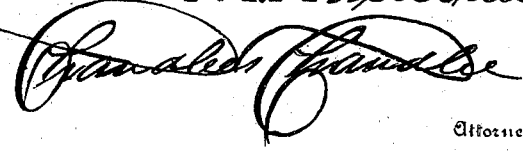
Figure 2:
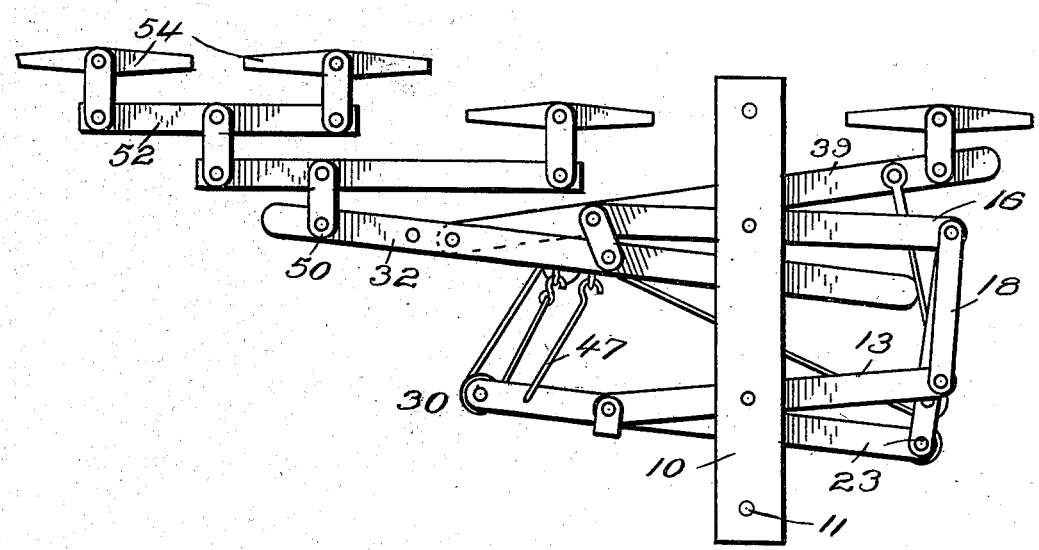
Figure 4:
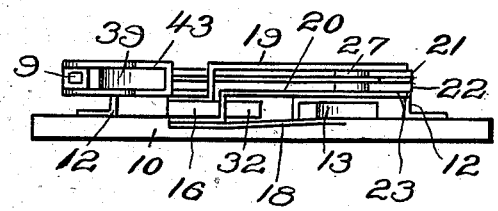
Figure 4:
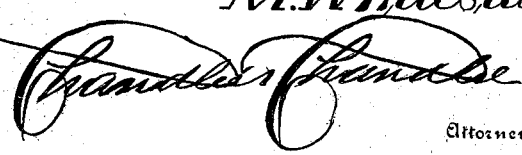

In the drawings forming a portion of the specification, and in which like numerals of reference indicate similar parts in the several views, Figure 1 is a top plan view showing the equalizer adjusted for use with a single animal at one side of the tongue and three animals at the opposite side of the tongue. Fig. 2 is a bottom plan view of the structure shown in Fig. 1. Fig. 3 is a rear elevation of the equalizer. Fig. 4 is a side elevation of the equalizer.

Referring now to the drawings, the present equalizer comprises a central beam 10, having perforations 11 at its ends to receive bolts by means of which the equalizer is removably secured to the tongue of the vehicle or implement, and upon the beam 10 is disposed a longitudinal strap 12, attached at its ends to the beam and having its intermediate portion spaced therefrom.

Pivoted against the upper face of the rear end portion of the beam 10 and between said beam and the strap 12 is a tree 13, having a series of perforations 14 to receive interchangeably the pivot-bolt 15, which is passed through the tree, the strap, and the beam, provision being thus made to adjust the bolt, which forms a fulcrum for the tree or lever 13.

Upon the upper face of the forward portion of the beam 10 and between it and the strap 12 is disposed a second tree or lever 16, which is held in place by a pivot-bolt 17, engaged through perforations in the beam and strap and adapted for engagement interchangeably with the perforations 17' of the lever 16 when said lever is shifted longitudinally to change the position of its fulcrum formed by the bolt.

At that end of the tree or lever 13 on the side at which the single draft-animal is attached and which for convenience may be termed the "inner" side or "grain" side of the equalizer there is pivoted a link 18, which is pivoted at its forward end to the grain end of the lever 16, so that the levers 16 and 13 may be moved one from the other. Pivoted to the lever 16 at the point of connection of the link 18 and against the upper and the lower faces thereof are spaced links 19 and 20, which at their opposite ends are pivoted to the arms 21 and 22 at one bifurcated end of a lever 23, which is pivoted at a point between its ends by means of a bolt 24, which may be engaged with any one of a series of perforations 25 in the lever 23, said bolt thus forming a shiftable fulcrum for the lever 23. Between the arms 21 and 22 is mounted a pulley-wheel 26, while a second pulley 27 is mounted between the links 19 and 20, these pulleys being for a purpose presently to be explained. The opposite end of the lever 23 from the pulley 26 is also bifurcated to form spaced arms 28 and 29, between which is mounted a pulley 30.

Connected to the outer end of the lever 16, which is the end opposite to the grain side of the equalizer, by means of links 31 is a lever 32, having a longitudinal series of perforations 33, with which the bolt 34, passing through the links, may be engaged interchangeably, so that the fulcrum formed by the bolt may be shifted. At the outer end of the lever 32 is a longitudinal series of perforations 35, which are adapted to interchangeably receive the attaching-bolt 36 of a clevis 37, through which and through the lever 32 is engaged a bolt 38, which forms the fulcrum of a lever 39, held between the clevis and the upper face of the lever 32. In the lever 39 is formed a series of perforations 40, and around the outer end portion of the lever is disposed a strap or clip, between the free ends of which and at the rear side of the lever is mounted a roller or pulley 41, the clip being held at the desired point longitudinally of the lever 39 by means of a bolt 42, passed through the clip and a corresponding perforation 40. Attached to the opposite or grain end of the lever 40 by means of a clevis 43, engaged with one of the perforations 40, is a cable 44, which is passed rearwardly and around the pulley 27, then forwardly and around the pulley 41, and then rearwardly around the pulley 30, said cable having a hook 45 at its end for engagement with the eyes 46 interchangeably of eyebolts that are engaged through the lever 32. Engaged also with one of the eyebolts 46 is a hook 47, pivotally connected with the lever 23, said hook being disengaged from the eyebolt when under operating conditions it is desired for the cable to draw the levers 23 and 32 toward each other.

Attached to the grain end of the lever 39 by means of a clevis 48 is a singletree 49, and engaged in one of the perforations 35 at the outer end of the lever 32 is a clevis 50, connected with a tree 51, having a doubletree 52 at one end and a singletree 53 at the opposite end, the doubletree 52 having in turn singletrees 54 attached thereto.

With this construction it will be seen that when draft is applied to the singletree 49 the cable 44 is drawn and the outer end of the lever 39 is swung rearwardly, due to the fact that the opposite end of the cable draws the lever 32 rearwardly, while strain is applied upon the pulley 41 to draw it rearwardly, it being understood that under these conditions the hook 47 is disengaged with the eyebolt of the lever 32. By shifting the fulcrums of the levers, by shifting the clip of the pulley 41, and by engaging the cable with the pulley 26, as also by shifting the clevises 40 and 50 longitudinally of their respective levers, the draft on the singletree 49 may be caused to balance different drafts on the lever 32.

It will be understood that in practice modifications of the specific construction shown may be made and any suitable materials and proportions may be used for the various parts without departing from the spirit of the invention.

What is claimed is—

1. A draft-equalizer comprising a main beam having levers fulcrumed transversely thereof at its front and rear ends respectively, and having a link connecting them at one end, a lever fulcrumed to the rear transverse lever and having a link connecting it with the corresponding end of the front transverse lever, said link and the opposite end of the lever on the rear transverse lever having pulleys, a draft-lever pivotally connected with the front transverse lever and adapted for connection of a tree to its outer end, a second draft-lever fulcrumed to the first draft-lever and provided with a pulley, and a cable attached to the second draft-lever and engaged successively with the pulleys of the links, the second draft-lever and the lever on the rear transverse lever and attached at the rear end to the first-named draft-lever, the second draft-lever being adapted for attachment of a tree.

2. A draft-equalizer comprising a main beam having levers fulcrumed transversely thereof at its front and rear ends respectively, and having a link connecting them at one end, a lever fulcrumed to the rear transverse lever and having a link connecting it with the corresponding end of the front transverse lever, said link and the opposite end of the lever on the rear transverse lever having pulleys, a draft-lever pivotally connected with the front transverse lever and adapted for connection of a tree to its outer end, a second draft-lever fulcrumed to the first draft-lever and engaged successively with the pulleys of the links, the second draft-lever and the lever on the rear transverse lever and attached at the rear end to the first-named draft-lever, the second draft-lever being adapted for attachment of a tree, the fulcrums of the several levers being adjustable.

3. A draft-equalizer comprising a main beam having levers fulcrumed transversely thereof at its front and rear ends respectively and having a link connecting them at one end, a supplemental lever fulcrumed upon the rear transverse lever, links connecting the supplemental lever with the corresponding end of the front transverse lever and having pulleys, a pulley at the opposite end of the supplemental lever, a draft-lever having pivotal connection with the front transverse lever and provided with cable-attaching means, a second draft-lever fulcrumed to the first draft-lever and having a pulley connected thereto for adjustment longitudinally thereof, and a cable connected with the second draft-lever and engaged with a pulley of the links and the pulley of the draft-lever and supplemental lever, successively and adapted for engagement with the cable-attaching means interchangeably, the draft-levers being adapted for connection of trees thereto.

4. A draft-equalizer comprising a main beam having levers fulcrumed transversely thereof at its front and rear ends, respectively and having a link connecting them at one end, a supplemental lever fulcrumed upon the rear transverse lever, links connecting the supplemental lever with the corresponding end of the front transverse lever and having pulleys, a pulley at the opposite end of the supplemental lever, a draft-lever having pivotal connection with the front transverse lever and provided with cable-attaching means, a second draft-lever fulcrumed to the first draft-lever and having a pulley connected thereto for adjustment longitudinally thereof, and a cable connected with the second draft-lever and engaged with a pulley of the links and the pulleys of the draft-lever and supplemental lever successively, and adapted for engagement with the cable-attaching means interchangeably, the draft-levers being adapted for connection of trees thereto, the fulcrums of the several levers being adjustable.

In testimony whereof I affix my signature in presence of two witnesses.

MADISON $\overset{\text{his}}{\times}$ WHITESIDE.
mark

Witnesses:
 D. A. DRAKE,
 O. E. ROLINS.